(12) United States Patent
Sakurai

(10) Patent No.: US 6,456,801 B1
(45) Date of Patent: Sep. 24, 2002

(54) IMAGE FORMING APPARATUS WITH A SHEET-SIZE SPECIFYING FUNCTION

(75) Inventor: Atsushi Sakurai, Kunitachi (JP)

(73) Assignee: Toshiba TEC Kabushiki Kaisha, Tokyo (JP)

(*) Notice: Subject to any disclaimer, the term of this patent is extended or adjusted under 35 U.S.C. 154(b) by 0 days.

(21) Appl. No.: 09/881,844

(22) Filed: Jun. 18, 2001

(51) Int. Cl.[7] .................. G03G 15/00; G03G 21/00
(52) U.S. Cl. .................. 399/16; 399/389; 399/392
(58) Field of Search .................. 399/16, 18, 361, 399/363, 389, 392; 271/9.06, 9.09, 265.01

(56) References Cited

U.S. PATENT DOCUMENTS

| | | | | |
|---|---|---|---|---|
| 5,061,958 A | * | 10/1991 | Bunker et al. | 399/16 X |
| 5,208,902 A | * | 5/1993 | Kumon | 399/16 X |
| 6,330,423 B1 | * | 12/2001 | Kitazawa | 399/392 |

FOREIGN PATENT DOCUMENTS

| | | | |
|---|---|---|---|
| JP | 4-9837 | | 1/1992 |
| JP | 09-018661 | * | 1/1997 |

* cited by examiner

*Primary Examiner*—Sophia S. Chen
(74) *Attorney, Agent, or Firm*—Foley & Lardner

(57) ABSTRACT

The present invention provides an image forming apparatus for reading an image on a document having a main scanning direction and a sub scanning direction and forming a copy image of the image on a copy image forming medium. When a sheet feeding section selects a manual feeding tray to feed the copy image forming mediums therefrom, an automatic document upsetting section two-dimensionally detects a size of a first one of the copy image forming mediums fed from the manual feeding tray. A controlling section controls a reading section to read the image in accordance with the detected size of the copy image forming mediums, and controlling the image forming section for forming the copy image on the copy image forming mediums.

9 Claims, 13 Drawing Sheets

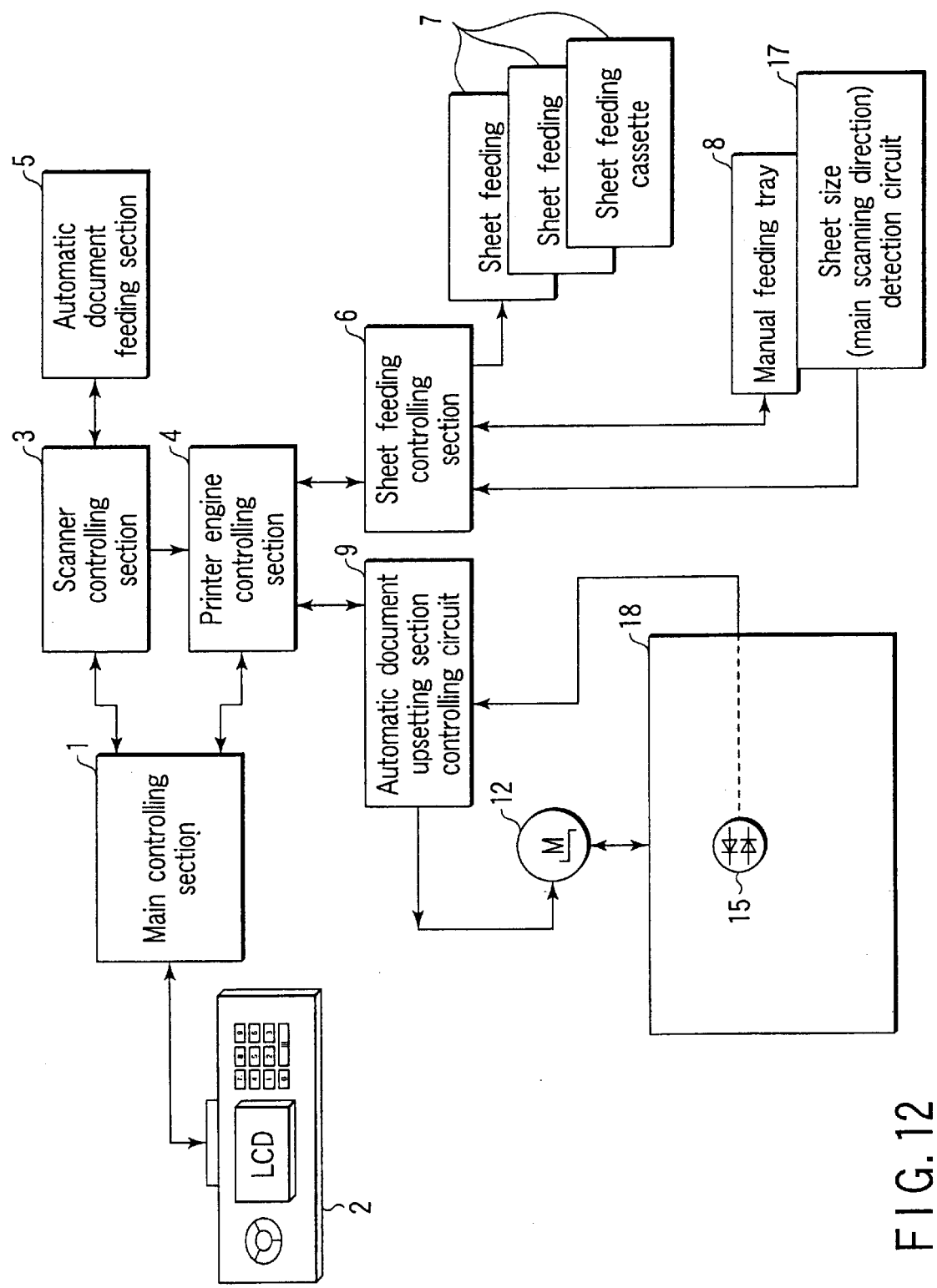
F I G. 12

IMAGE FORMING APPARATUS WITH A SHEET-SIZE SPECIFYING FUNCTION

BACKGROUND OF THE INVENTION

Conventionally, a manual feeding unit has been employed in printing on non-standard sheet, OHP, thick paper, or the like with a copying machine. The manual feeding unit comprises a tray placing a sheet and a member for guiding edges arranging parallel to the sheet-feeding direction. The most of the manual feeding units has a structure for determining the size of the placed sheet in the main scanning direction by sliding the guiding member in the main scanning direction.

On the other hand, the size in the sheet-feeding direction (the sub scanning direction) is assumingly determined as the maximum size presumable from the sheet size in the main scanning direction. When the actual size of the sheet in the sheet-feeding direction is smaller than the assumed maximum size, the rear end edge of the sheet is detected by a sensor and the printing is forcedly stopped in detecting the rear end edge in accordance with the installed program. If the printing is stopped, however, the document scanning operation continues till the maximum size of the document is scanned completely. The carriage thus continues the unnecessary operation even after the printing is stopped.

In addition, the size in the sheet-feeding direction is an assumed size, and thus the scanner performs the scanning assuming the sheet has the presumable maximum size in the sheet-feeding direction. Therefore, when the actual size in the sheet-feeding direction is smaller than the assumed maximum size, the redundant data in an area in which the actual document is not exist is rejected. This process terribly decreases the scanning operation speed in printing with use of the manual feeding unit. In other words, the printing speed with use of the manual feeding unit cannot be increased due to this process.

Further, according to the conventional apparatus the printing has to be started in the condition where the size in the sheet-feeding direction is assumingly determined as the presumable maximum size. The sorts of functions that can be used in this condition are so limited in comparing with the printing using a sheet-feeding cassette. More specifically, in order to set the binding space, the area to be printed needs to be adjusted. The adjustment is useful in the case where the document size is given. When the printing is performed with use of the manual feeding unit, however, the precise sheet size in the sheet-feeding direction is not given. In such a condition, the area to be printed cannot be adjusted, and thus the adjusting operation will be determined as invalid.

Further, the conventional manual feeding unit detects the size of the sheet in the main scanning direction. The apparatus thus needs to be provided with a size detecting mechanism and a sensor, and the components increases, which complicates the structure of the apparatus, resulting in the increase of the manufacturing cost.

FIG. 1 shows the structure of the digital copying machine as the conventional image apparatus to describe in detail.

As shown in FIG. 1, the copying machine comprises as a basic structure a main controlling section 201, a scanner controlling section 203, an automatic document feeding section 205, a printer engine controlling section 204, a sheet feeding controlling section 206, an automatic document upsetting section controlling circuit 209, and a sheet feeding cassette 207.

The copying machine further comprises a manual feeding tray 208 having a sheet size detection circuit 217 for detecting the sheet size in the main scanning direction. An automatic document upsetting section 216 does not detect the sheet size, and thus has no sensor. Similarly, a sheet guide controlling section 210 also does not perform the sheet size detection, and thus controls a motor merely to align the stacked sheets.

As shown in the diagram, the conventional copying machine has a rear end edge detection circuit 218 for detecting the sheet feeding direction in feeding the sheet. After detecting the rear end edge of the sheet by this section, the printer engine controlling section 204 performs a processing of stopping the printing by force.

On the other hand, with the conventional copying machine, the user can manually set the sheet size in the manual feeding printing.

The operation of the digital copying machine as the conventional image forming apparatus will be described in detail with reference to the flow chart of FIG. 2.

The user sets a document on a document mounting table (step S101), aligns sheets on the manual feeding tray 208 (step S102), sets the size of the sheet manually fed by operating a control panel 202 (step S103), and pushes a start button on the control panel 202 (step S104).

After pushing the start button, the parameters are set in accordance with the sheet size (step S105), and then the first sheet is picked up from the manual feeding tray 208 to be fed into the inside of the apparatus (step S106) to be subjected to the predetermined printing process (step S107), ejected thereafter (step S108).

When the manual feeding tray 208 mounts more than one sheet, the sheets are serially picked up from the manual feeding tray 208 to be subjected to the printing process (steps S109 to 111).

If the sheet size is wrongly set in the above-mentioned process, the document size and the sheet size does not match each other, which prevents the proper printing. With the result, unclear printing may occur and the printing efficiency will be adversely affected.

BRIEF SUMMARY OF THE INVENTION

The present invention has been developed in consideration of the above, and is intended to automatically determining the sheet size in the sheet conveying direction prior to the printing operation such that various settings or processings can be attained prior to the printing. Further, the redundant scanning operation exceeding the sheet size does not need to be performed since the sheet size can be specified prior to the printing operation. As a result, the interval between the printing operations can be decreased, and thus the printing speed can be increased. In addition, according to the present invention, the sheet size is automatically preformed and user does not need to perform the complicated operation, and thus the printing efficiency is remarkably improved. Still further, according to the present invention, the manual feeding unit may have only a sheet holding function, and can be formed in a simple structure, resulting in the decrease of the manufacturing cost.

In order to attain the above-mentioned object, the present invention provides an image forming apparatus for reading an image on a document having a main scanning direction and a sub scanning direction and forming a copy image of the image on a copy image forming medium, comprising: a conveying section which automatically conveys the document; a reading section which reads the image on the document; an image forming section which forms an image on the copy image forming medium; a sheet feeding section having a plurality of sheet feeding cassettes respectively containing corresponding one of sizes of the copy image forming mediums, and a manual feeding tray for manually stacking a desired size of the copy image forming mediums, the sheet feeding section feeds sheets selectively from one of the manual feeding tray and the sheet feeding cassettes; an automatic document upsetting section which two-dimensionally detects a size of a first one of the copy image forming mediums fed from the manual feeding tray when the sheet feeding section selects the manual feeding tray to feed the copy image forming mediums therefrom; and a controlling section which controls the reading section to read the image in accordance with the detected size of the copy image forming mediums, and controls the image forming section for forming the copy image on the copy image forming mediums.

The present invention further provides an image forming apparatus for reading an image on a document having a main scanning direction and a sub scanning direction and forming a copy image of the image on a copy image forming medium, comprising: a document conveying section which automatically conveys the the document; a reading section which reads the image on the document; an image forming section which forms an image on the copy image forming medium; a sheet feeding section having a plurality of sheet feeding cassettes respectively containing corresponding one of sizes of the copy image forming mediums, and a manual feeding tray which manually stacks a desired size of the copy image forming mediums, the sheet feeding section feeds sheets selectively from one of the manual feeding tray and the sheet feeding cassettes; an automatic document upsetting section having a copy image forming medium aligning guide movable in two directions and an optical sensor for optically detecting one of a presence and an absence of the copy image forming medium, the automatic document upsetting section which two-dimensionally detects a size of a first one of the copy image forming mediums fed from the manual feeding tray in accordance with a moving distance of the copy image forming medium aligning guide and an output signal of the sensor; and a controlling section which controls the reading section to read the image in accordance with the detected size of the copy image forming mediums, and controls the image forming section for forming the copy image on the copy image forming mediums, and, when the image forming section forms the copy image on a plurality of the copy image forming mediums, the controlling section controls the image forming section to form a first image by feeding one of the copy image forming mediums from the automatic document upsetting section, and controls the image forming section to form a second image by feeding one of the copy image forming mediums from the manual feeding tray.

Still further, the present invention provides an image forming apparatus for reading an image on a document having a main scanning direction and a sub scanning direction and forming a copy image of the image on a copy image forming medium, comprising: a document conveying section which automatically conveys the document; a reading section which reads the image on the document; an image forming section which forms an image on the copy image forming medium; a sheet feeding section having a plurality of sheet feeding cassettes respectively containing corresponding one of sizes of the copy image forming mediums, and a manual feeding tray for manually stacking a desired size of the copy image forming mediums, the sheet feeding section feeds sheets selectively from one of the manual feeding tray and the sheet feeding cassettes; an automatic document upsetting section having a mechanical sensor for mechanically detecting one of a presence and an absence of the copy image forming medium, the automatic document upsetting section two-dimensionally detects a size of a first one of the copy image forming mediums fed from the manual feeding tray in accordance with an output signal of the sensor; and a controlling section which controls the reading section to read the image in accordance with the detected size of the copy image forming mediums, and controls the image forming section for forming the copy image on the copy image forming mediums, and, when the image forming section forms the copy image on a plurality of the copy image forming mediums, the controlling section controls the image forming section to form a first image by feeding one of the copy image forming mediums from the automatic document upsetting section, and controls the image forming section to form a second image by feeding one of the copy image forming mediums from the manual feeding tray.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is a block diagram showing a structure of a digital copying machine as an example of the image forming apparatus according to the second embodiment of the present invention.

DETAILED DESCRIPTION OF THE INVENTION

Hereinafter, embodiments of the present invention will be described with reference to the drawings.

First, the first embodiment of the present invention will be described.

Figure 1:
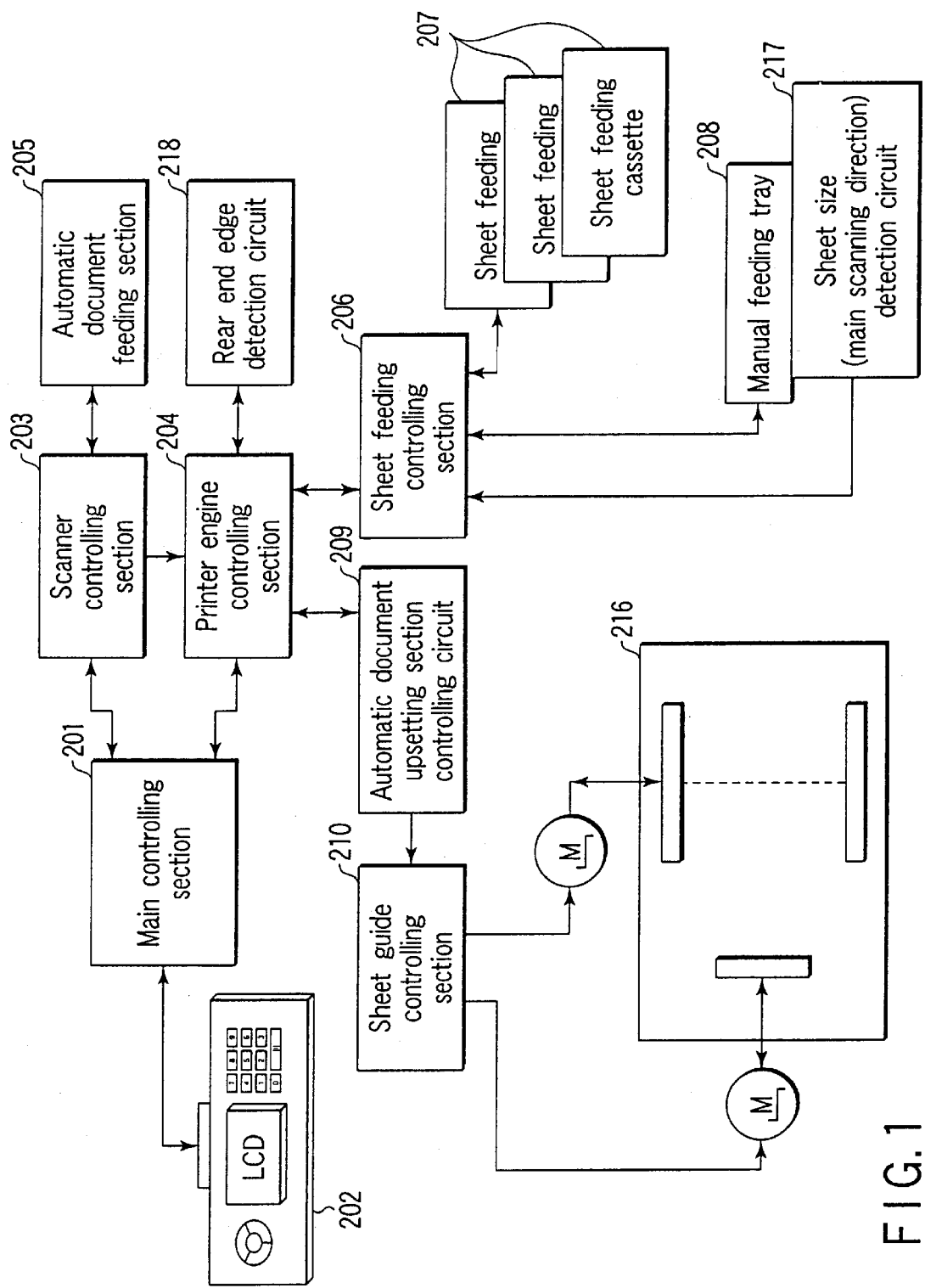
FIG. 1 is a block diagram showing the structure of the conventional image forming apparatus.
Figure 2:
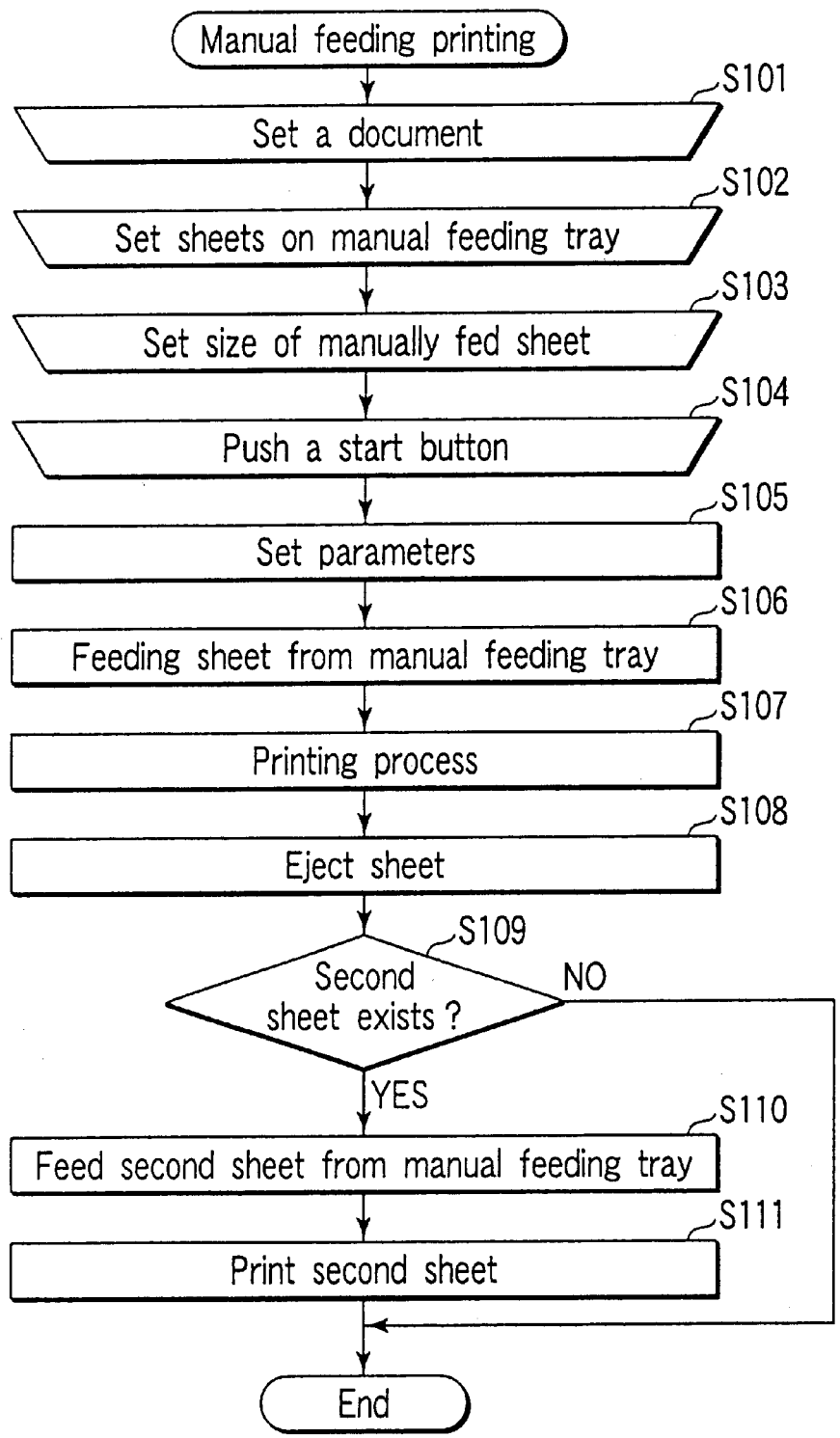
FIG. 2 is a flow chart showing the flow of the manual feeding printing process of the conventional image forming apparatus.
Figure 3:
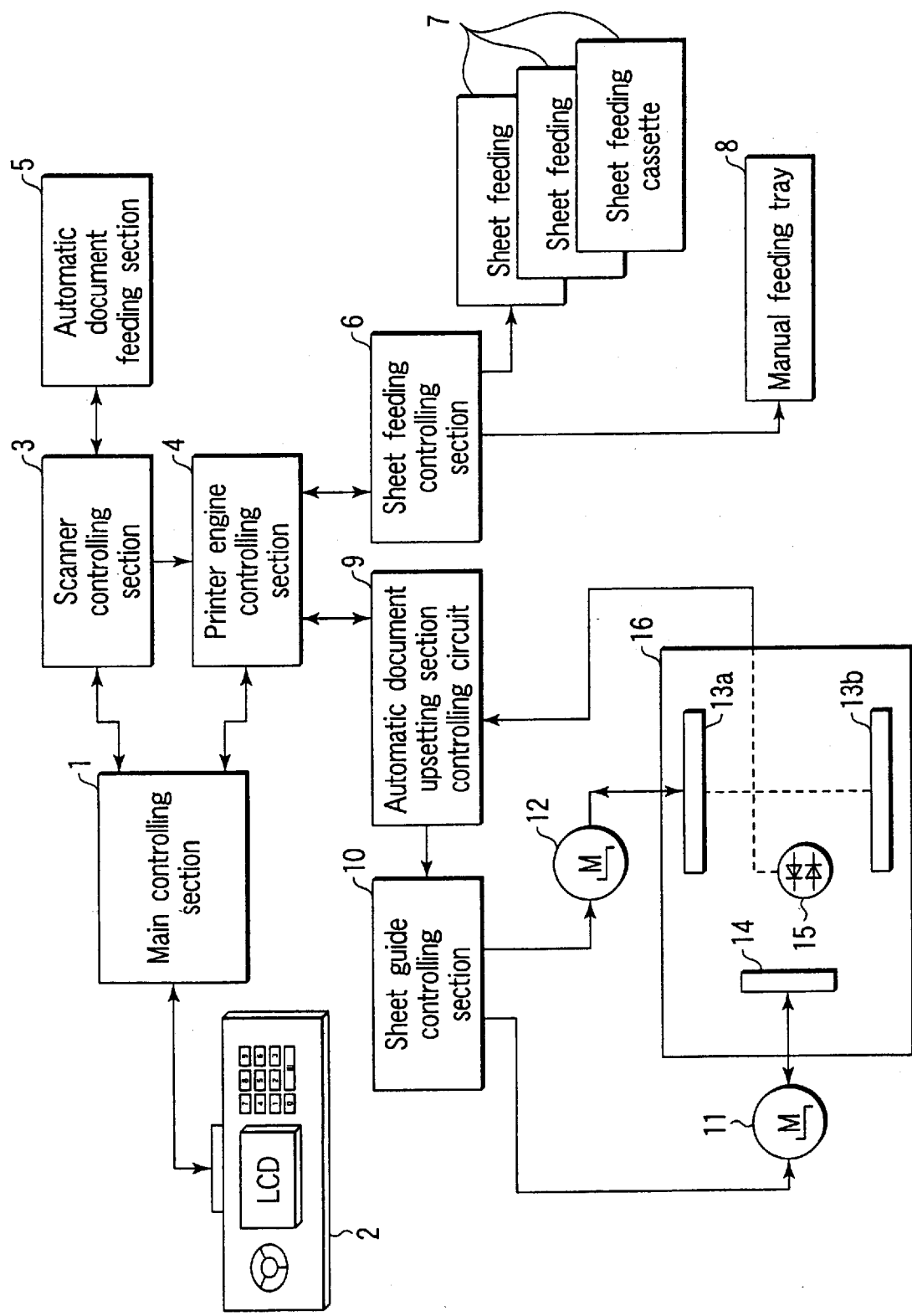
FIG. 3 is a block diagram showing a structure of a digital copying machine as an example of the image forming apparatus according to the first embodiment of the present invention.

FIG. 3 shows a digital copying machine as an example of the image forming apparatus according to the first embodiment of the present invention to describe in detail.

As shown in FIG. 3, the digital copying machine comprises a main controlling section 1 for controlling the entire apparatus. The main controlling section 1 is connected to a control panel 2, a scanner controlling section 3, and a printer engine controlling section 4 so as to communicate each other. The scanner controlling section 3 is connected to an automatic document feeding section 5.

The printer engine controlling section 4 is connected to a sheet feeding controlling section 6 and an automatic document upsetting section controlling circuit 9. The sheet feeding controlling section 6 is connected to a sheet feeding cassette 7 and a manual feeding tray 8. The output terminal of the automatic document upsetting section controlling circuit 9 is connected to input terminals of motors 11 and 12. The output terminal of a sensor 15 is connected to the input of the automatic document upsetting section controlling circuit 9.

In this embodiment, an optical device such as a photoreflector is employed as the sensor 15, but the other device can be used.

With the above structure, when the operator operates operating buttons (not shown) on the control panel 2 to set predetermined parameters, the set parameters are sent to the main controlling section 1. The main controlling section 1 executes a predetermined control on the basis of the set parameters. The control panel 2 displays various data of the copying machine.

The scanner controlling section 3 drives the automatic document feeding section 5. The printer engine controlling section 4 drives the sheet feeding controlling section 6. The sheet feeding controlling section 6 drives the sheet feeding cassette 7 and a manual feeding tray 8. The printer engine controlling section 4 also drives the automatic document upsetting section controlling circuit 9. The automatic document upsetting section controlling circuit 9 drives a sheet guide controlling section 10. The sheet guide controlling section 10 controls the motors 11 and 12 to control the sheet feeding from sheet guides 13a, 13b, and 14. The output from the sensor 15 arranged near the central portion of an automatic document upsetting section 16 is fed back to the automatic document upsetting section controlling circuit 9. The feed back information is used by the automatic document upsetting section controlling circuit 9 to control the sheet guide controlling section 10 and determine the sheet size.

Figure 4:
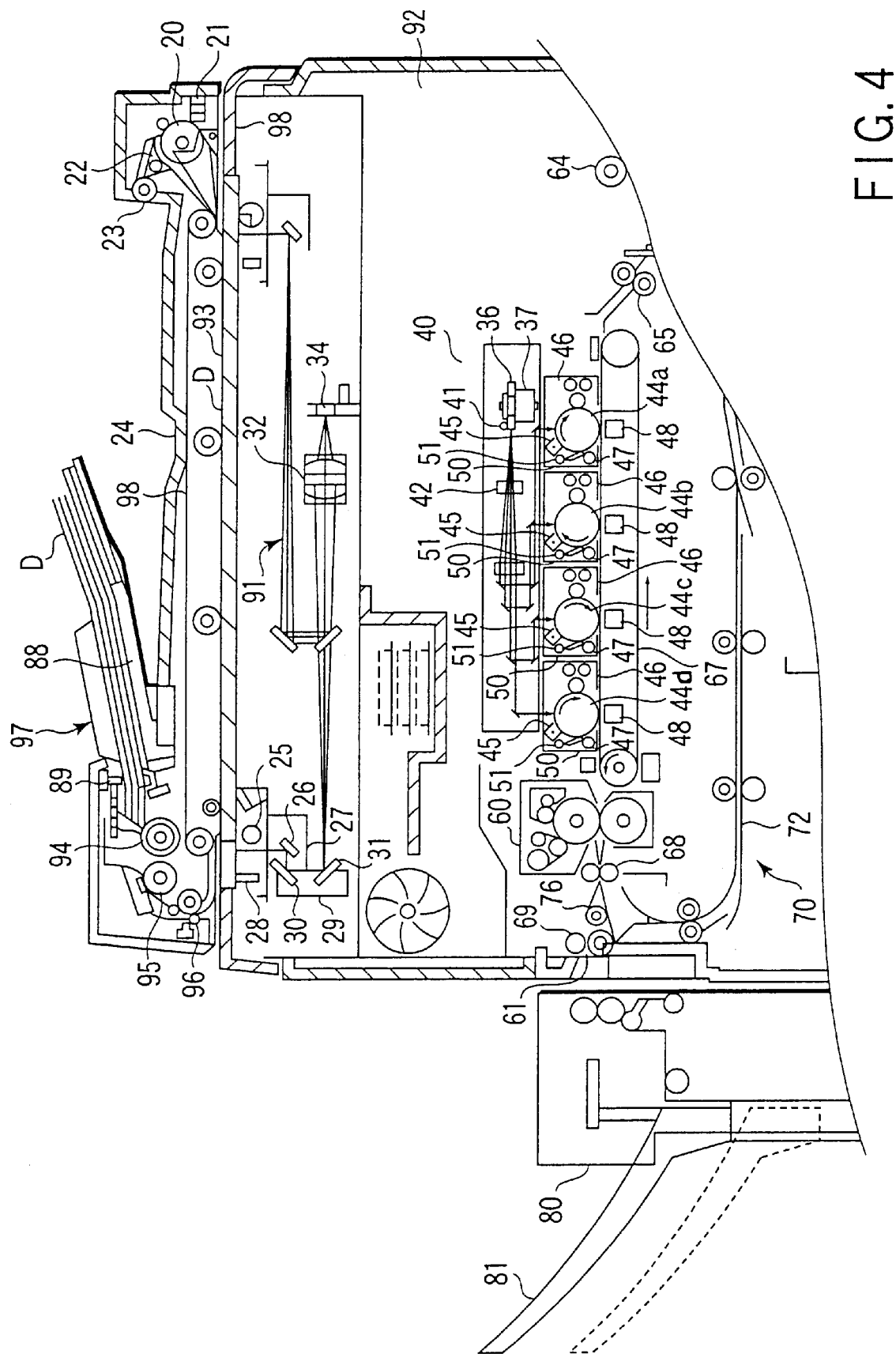
FIG. 4 is a sectional view showing the inner structure of the digital copying machine as an example of the image forming apparatus according to the first embodiment of the present invention.
Figure 5:
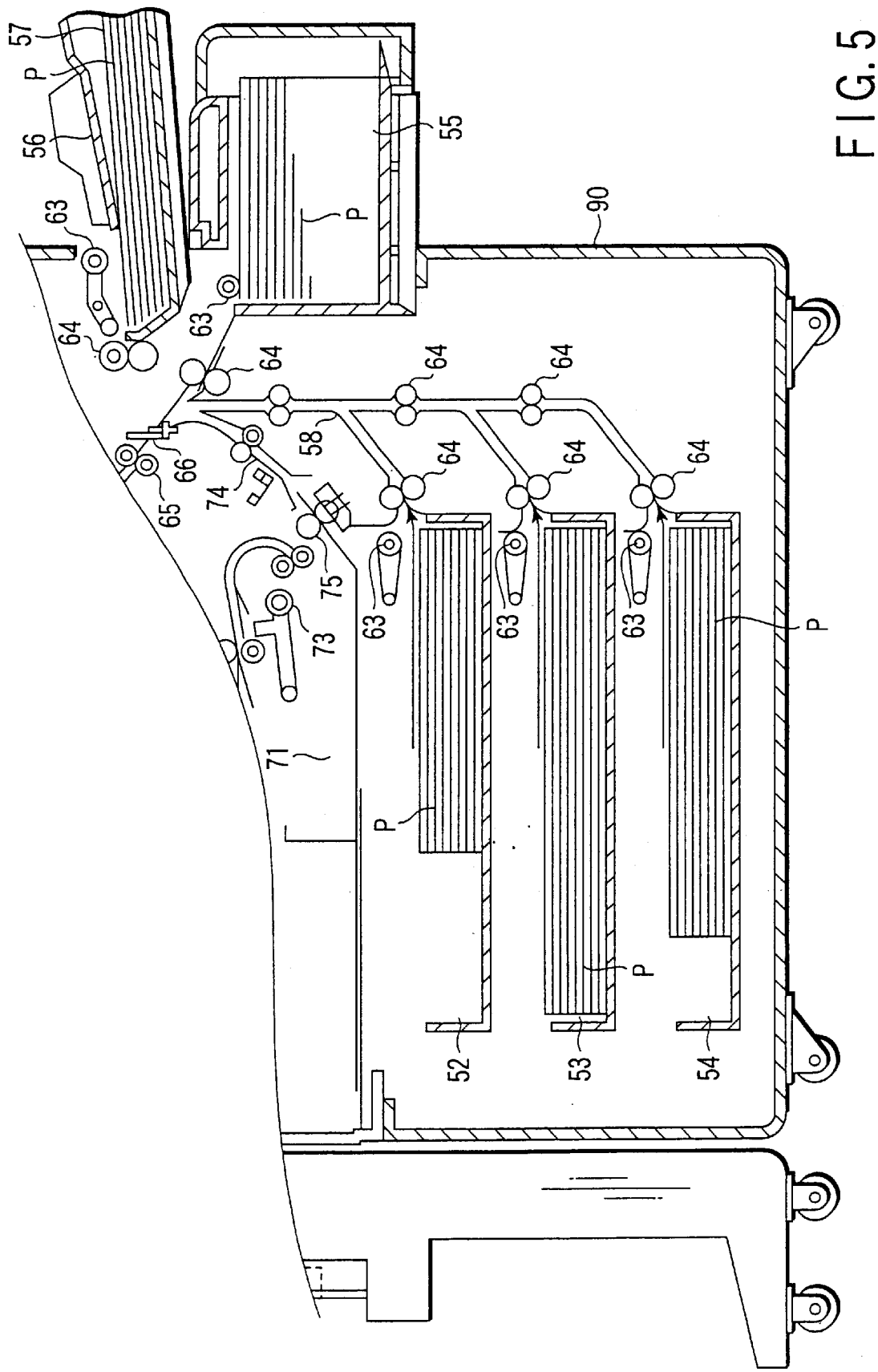
FIG. 5 is a sectional view showing the inner structure of the digital copying machine as an example of the image forming apparatus according to the first embodiment of the present invention.

The inner structure of the digital copying machine as an example of the image forming apparatus according to the first embodiment of the present invention will be described next in detail in conjunction with FIGS. 4 and 5.

There is provided on the top of an apparatus body 90 an automatic document feeding device (hereinafter referred to as "ADF") 97 so as to be opened/closed. The ADF 97 also functions as a document cover. The ADF 97 is provided to automatically feed sheet-like documents one by one. The apparatus is provided at the front portion on its top face with various operating keys for setting a copying condition and instructing the start of the copying operation. There are also provided at the front portion on its top face with a control panel having various indicators. On the right side of the apparatus, there are detachably provided a sheet feeding cassette 57 capable of containing a small amount of sheets and a large capacity sheet cassette 55.

The sheet feeding cassette 57 has a manual feeding tray 56 for manually feeding a sheet. The apparatus body 90 has in a lower portion a plurality of detachable sheet feeding cassettes 52, 53, and 54. The sheet feeding cassettes 52, 53, and 54 respectively contain sheets which have a predetermined size and laid in the lateral/longitudinal directions. The sheet feeding cassettes 52, 53, and 54 are selected in necessity.

On the left side of the apparatus 90, there is provided a finisher 80 for receiving the printed sheet. The apparatus body 90 has below the control panel at the front portion thereof an inserting opening (not shown) to which an optomagnetic disk as a storage medium for storing image data or the like. An optomagnetic disk device (not shown) is provided in the apparatus body 90. On the rear side of the apparatus 90, a parallel port (not shown), a serial port (not shown), and an SCSI (not shown), and the like are arranged.

The parallel port connects the apparatus and the outer apparatus such as a PC when the apparatus is employed as a printer. In maintaining the apparatus, the control information of the apparatus is read through the serial port. The serial port is also used to connect the apparatus and the outer apparatus such as a PC in setting the functions of the apparatus. The SCSI is provided to perform the communication of command/data between the apparatus and a printer controller (not shown) arranged outside the apparatus.

The apparatus body 90 also have therein a scanner section 91 for attaining image data and a printer section 92, by which copying operation and facsimile operation can be attained. On the top face of the apparatus body 90, a document mounting table 93 for mounting a document D as an object to be read, an ADF 97 for automatically feeding the document onto the document mounting table 93, which can be opened with respect to the document mounting table 93.

The ADF 97 has a document tray 88, an empty sensor 89, a pickup roller 94, a feeding roller 95, an aligning roller pair 96, an aligning sensor (not shown), a size sensor (not shown), and a feeding belt 98.

The document D is set on the document tray 88. The empty sensor 89 detects presence/absence of the document. The pickup roller 94 picks the documents from the document tray 88 one by one. The feeding roller 95 conveys the document picked up by the pickup roller 94. The aligning roller pair 96 align the front edge of the document. The aligning sensor is arranged in the upstream of the aligning roller pair 96 to detect the arrival of the document. The size sensor detects the size of the document D. The feeding belt 98 is arranged to cover almost entire surface of the document mounting table 93.

A plurality of documents are set in the document tray 88 to lay their faces up, and are picked up one by one such that the bottom sheet, i.e., the last page of the documents is picked up at first among the documents. The picked documents are aligned by the aligning roller pair 96, and then serially sent to a predetermined position on the document mounting table 93.

On the end portion of the ADF 97 on the opposite side of the aligning roller pair 96 with respect to the feeding belt 98, there are arranged an inverting roller 20, a non-inverting sensor 21, a flapper 22, and a sheet ejection roller 23. The document D from which image data is read by a scanner section 91 which will be described later is sent from the document mounting table 93 by the feeding belt 98. The document D passes through the inverting roller 20, the flapper 22, and the sheet ejection roller 23 to be ejected onto a document ejection section 24 on the ADF 97. When the rear side of the document D needs to be read, the flapper 22 is switched so that the inverting roller 20 inverts the document D sent by the feeding belt 98. The inverted document D is then sent to a predetermined position on the document mounting table 93 once more by the feeding belt 98.

The ADF 97 has a feeding motor for driving the pickup roller 94, the feeding roller 95, and the aligning roller pair 96, and a conveying motor for driving the feeding belt 98, the inverting roller 20, and the sheet ejection roller 23.

The scanner section 91 arranged in the apparatus 90 has a light source 25 such as a fluorescent lamp for irradiating the document D mounted on the document mounting table 93, a first mirror 26 for deflecting a reflection light reflected from the document D in a predetermined direction.

The light source 25 and the first mirror 26 are attached to a first carriage 27 arranged below the document mounting table 93. There is arranged above the first carriage 27 a size sensor 28 for detecting the size of the document mounted on the document mounting table 93. The first carriage 27 is provided so as to move parallel to the document mounting table 93. The first carriage 27 is driven by the driving motor via a belt having gears so as to reciprocate below the document mounting table 93.

There is arranged below the document mounting table 93 a second carriage 29 capable of moving parallel to the document mounting table 93. The second carriage 29 is provided with second and third mirrors 30 and 31 for deflecting the reflection light reflected from the document D and deflected by the first mirror 26 such that the second and third mirrors 30 and 31 are arranged to be perpendicular to each other. The second carriage 29 is moved in accordance with the movement of the first carriage 27 by the belt having gears for driving the first carriage 27, or the like. The second carriage 29 is moved at a half speed of that of the first carriage 27 by the belt having gears for driving the first carriage 27 in parallel to the first carriage 27 along the document mounting table 93.

There are provided below the document mounting table 93 an imaging lens 32 for focusing the reflection light from the third mirror 31 on the second carriage 29, and a CCD sensor for photoelectrically converting the reflection light focused by the imaging lens 32. The imaging lens 32 is arranged on a plane including an optical axis of the light deflected by the third mirror 31 so as to be moved by a driving mechanism. The imaging lens 32 images the reflection light at a desired magnification by moving itself. The CCD 34 photoelectrically converts the incident reflection light, and outputs an electric signal corresponding to the read document D.

On the other hand, the printer section 92 has a laser exposing device 40. The laser exposing device 40 has a semiconductor 41 as a light source, a polygon mirror 36 as a scanning member, a polygon motor 37 as a scanning motor, and an optical system 42. The laser light emitted from the semiconductor 41 is deflected serially by the polygon mirror 36. In this time, the polygon mirror 36 is rotated by the polygon motor 37 at a predetermined rate described later. The laser light is deflected by the polygon mirror 36 and guided to photosensitive drums 44a to 44d (described later) through the optical system 42. The laser exposing device 40 having the structure as mentioned above is fixedly supported by a supporting frame (not shown) of an apparatus 90.

The semiconductor 41 is switched on/off in accordance with the image data of the document D read by the scanner section 91. The laser light is led to the photosensitive drums 44a to 44d via the polygon mirror 36 and the optical system 42 to form electrostatic latent images on the circumferential surfaces of the photosensitive drums 44a to 44d by scanning the circumferential surfaces of the photosensitive drums 44a to 44d. The image printer section 92 has the rotatable photosensitive drums 44a to 44d as image carriers in an approximately central portion of the apparatus 90. On the circumferential surfaces of the photosensitive drums 44a to 44d, the desired electrostatic latent images exposed by the laser light emitted from the laser exposing device 40 are formed.

The photosensitive drums 44a to 44d are surrounded by charging chargers 45, developers 46, peeling chargers 47, transfer chargers 48, peeling crawls, cleaning devices 50, and a discharger 51. The charging chargers 45 charge the circumferential surfaces of the photosensitive drums 44a to 44d at a predetermined potential. The developers 46 supply toner as developer to the electrostatic latent images formed on the circumferential surfaces of the photosensitive drums 44a to 44d in order to develop the images with a desired concentration. The peeling chargers 47 peel the materials fed from the sheet feeding cassettes 52, 53, 54, 55, and 57, i.e., copy sheets P off the photosensitive drums 44a to 44d. The transfer chargers 48 transfer the toner images formed on the photosensitive drums 44a to 44d to the sheets P. The peeling crawls peel the sheets P off the circumferential surfaces of the photosensitive drums 44a to 44d. The cleaning devices 50 clean the toner left on the circumferential surfaces of the photosensitive drums 44a to 44d. The dischargers 51 discharge the circumferential surfaces of the photosensitive drums 44a to 44d.

The apparatus body 90 has in a lower portion the drawable sheet feeding cassettes 52, 53, and 54 stacked on each other. The sheet feeding cassettes 52, 53, and 54 respectively contain sheets that have a predetermined size. On the side of the sheet feeding cassettes 52, 53, and 54, the large capacity sheet cassette 55 is provided. There is detachably provided above the large capacity sheet cassette 55 the sheet feeding cassette 57 also functions as the manual feeding tray 56.

There is provided in the apparatus 90 conveying paths 58 extending from the sheet feeding cassettes 52, 53, 54, 55, and 57 to the transfer chargers 48 through a transfer section. At the ends of the conveying paths 58, a fixing device 60 is arranged. On the side wall of the apparatus, which faces the fixing device 60, an ejection opening 61 is formed to which a finisher 80 is attached.

Each of the sheet feeding cassettes 52, 53, 54, 55, and 57 is provided with a pickup roller 63 for picking sheets from the cassettes one by one. The conveying paths 58 has a plurality of sheet feeding roller pairs 64 for conveying the copy sheets P picked up by the pickup roller 63 through the conveying paths 58.

In the conveying paths 58, there is provided a resist roller pair 65 in the upstream of the photosensitive drums 44a to 44d. The resist roller pair 65 corrects the leaning of the picked sheet P, and aligns the toner images on the photosensitive drums 44a to 44d and the copy sheet P at the front edge.

The resist roller pair 65 feeds the copy sheet P at the same speed as the rotation speed of the photosensitive drums 44a to 44d. In front of the resist roller pair 65, i.e., on the side of the feeding roller pairs 64, an aligning sensor 66 for detecting the arrival of the copy sheet P is arranged. The copy sheets P picked up by one of the pickup rollers 63 one by one is sent to the resist roller pair 65 to be aligned, then sent to the transfer section by a conveying belt 67.

In the transfer section, the developer images, i.e., the toner images formed on the photosensitive drums 44a to 44d are transferred to the sheet P by the transfer chargers 48. The copy sheet P to which the toner images are transferred is peeled off the circumferential surfaces of the photosensitive drums 44a to 44d by the peeling chargers 47 and the peeling crawls (not shown), and sent to the fixing device 60 by conveying belt 67 constituting a part of the conveying path 58. The developer images are melted to be fixed on the copy sheet P by the fixing device 60. After fixing the images, the copy sheet P is sent to the eject tray 81 of the finisher 80 through the ejection opening 61 by a feeding roller pair 68 and an ejection roller pair 69.

The apparatus body 90 is provided below the conveying path 58 with an automatic sheet upsetting device (ADU) 70 for upsetting the copy sheet P passing through the fixing device 60 and sending it to the resist roller pair 65 again. To be more specific, the ADU 70 has a temporary accumulating section 71, an upsetting path 72, a pickup roller 73, and a feeding roller 75. The temporary accumulating section 71 temporarily accumulates the copy sheet P. The upsetting path 72 is a branch of the conveying path 58 and up sets the copy sheet P passing through the fixing device 60 and leads to the temporary accumulating section 71. The pickup roller 73 picks the copy sheets P accumulated in the temporary accumulating section 71 one by one. The feeding roller 75 feeds the sheet picked up by the pickup roller 73 to the resist roller pair 65 through the conveying path 74. The branching point of the conveying path 58 and the upsetting path 72 is provided with a splitting gate 76. The splitting gate 76 selectively splits the copy sheets P to the ejection opening 61 or the upsetting path 72.

In performing the double-side copying, the copy sheet P passing through the fixing device 60 is led to the upsetting path 72 by the splitting gate 76 to be upset, and temporarily accumulated in the temporary accumulating section 71. The copy sheet P is sent to the resist roller pair 65 through the conveying path 74 by the pickup roller 73 and the feeding roller pair 75.

The copy sheet P is aligned by the resist roller pair 65, and then sent to the transfer section again so that a toner image is transferred on the rear side of the copy sheet P. The copy sheet P then passes through the conveying path 58, the fixing device 60, and the ejection roller pair 69, and ejected to the eject tray 81 of the finisher 80.

With use of the ADU 70, the copy sheet P can be ejected in a condition where the copied face is turned down. More specifically, in the similar manner to that of performing the double-side copying, the toner image is transferred and fixed to the surface of the copy sheet P, and the copy sheet P is temporarily accumulated in the temporary accumulating section 71.

The copy sheet P is then sent to the resist roller pair 65 through the conveying path 74 by the pickup roller 73 and the feeding roller pair 75 so as to be aligned by the resist roller pair 65. The copy sheet P thereafter passes through the conveying path 58, the fixing device 60, and the ejection roller pair 69, and ejected to the eject tray 81 of the finisher 80.

Figure 6:
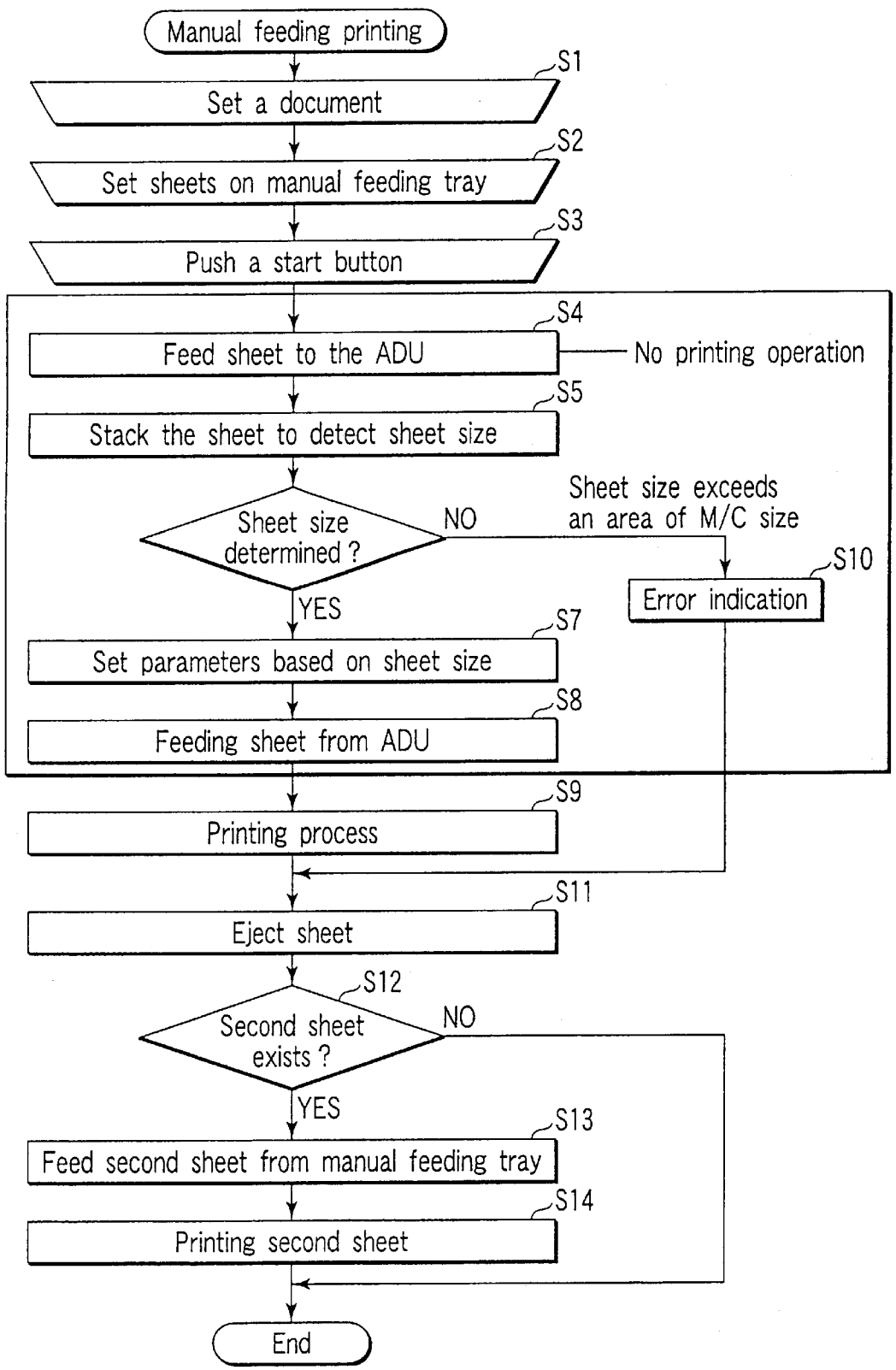
FIG. 6 is a flow chart showing the flow of the manual feed printing process of the digital copying machine as an example of the image forming apparatus according to the first embodiment of the present invention.

The detailed description of the manual feeding printing process of the digital copying machine as an example of the image forming apparatus according to the first embodiment of the present invention in conjunction with the flow chart of FIG. 6. In explaining the operation, FIGS. 3–5 should be also referred to in necessity.

The user sets a document on the document mounting table 93 (step S1), aligns sheets on the manual feeding tray 8 (step S2), and pushes a start button (not shown) on the control panel 2 (step S3).

After pushing the not shown start button, the first sheet is picked up from the manual feeding tray 8 to be fed into the inside of the apparatus 90 (step S4). The fed sheet passes through the fixing device 60 by the conveying belt, and then makes a U-turn in front of the ejection opening to be sent to the automatic document upsetting section 16.

The main controlling section 1 two-dimensionally detects the sheet size of the sheet sent to the automatic document upsetting section 16 with use of the sheet guides 13a, 13b, and 14 provided in the automatic document upsetting section 16 in accordance with the method the detail of which will be described later (step S5).

If the sheet size detected in the above-mentioned manner is larger than the size on which the printing can be performed by the apparatus, a predetermined error indication is presented, and the sheet is automatically ejected or the user is provoked attention (step S10).

If the detected sheet size is within the size on which the printing can be performed by the apparatus, the printing process is performed on the sheet stored in the automatic document upsetting section 16 at first (steps S7, S8, S9, and S11), and then the sheets on the manual feeding tray 8 are serially picked up from the manual feeding tray 8 to be subjected to the printing process as in the conventional method (steps S12 to S14)

Next, the sheet size detection process in the automatic document upsetting section 16 will be described in detail in conjunction with FIG. 7

Figure 7:
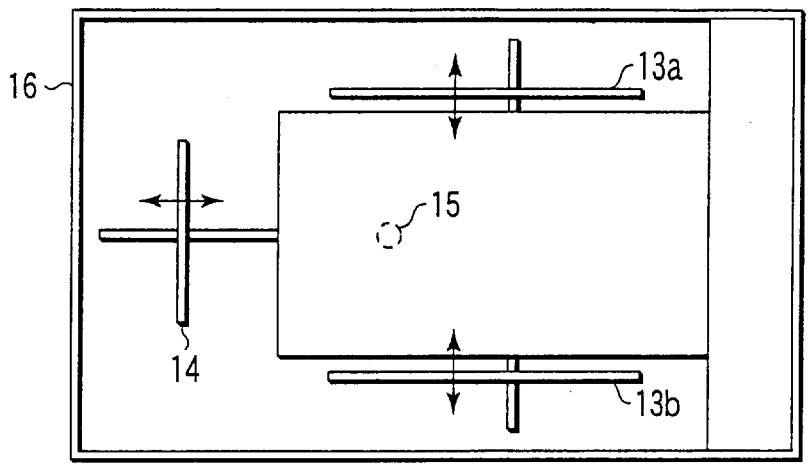
FIG. 7 is an explanatory view showing the sheet size detection process in the automatic document upsetting section of the digital copying machine as an example of the image forming apparatus according to the first embodiment of the present invention.

As shown in FIG. 7, the sheet size of the sheet sent to the automatic document upsetting section 16 in the main and sub scanning directions is detected with use of the three adjustable sheet guides 13a, 13b, and 14 provided for aligning the sheets in the automatic document upsetting section 16.

In this embodiment, the detection of the sheet size in the main scanning direction and that in the subscanning direction respectively need at least one of the sheet guides 13a, 13b, and 14.

At first of the detecting process, the sheet guides 13a and 13b perpendicular to the main scanning direction are slid in order to detect the size in the main scanning direction. The sheet guides 13a and 13b are driven by more than one motor 12. The moving amount of the sheet guides 13a and 13b is calculated in the automatic document upsetting section controlling circuit 9 on the basis of the period of the rotating time of the motor 12. In employing a stepping motor, the rotating time is calculated from the stepping number and the like.

At the initial state, the sheet guides 13a and 13b are set at the positions such that the width of the sheet in the main scanning direction is the maximum. In detecting that the sheets are stacked, the automatic document upsetting section controlling circuit 9 controls the sheet guide controlling section 10 to drives the motors 11 and 12, thereby moves the sheet guides 13a and 13b. The automatic document upsetting section 16 has the sensor 15 in the region in which the sheets are stacked. The sensor 15 detects the presence of the sheets only in the condition where the sheets are stacked horizontally. The automatic document upsetting section 16 may have a plurality of the sensor 15.

Figure 8A:
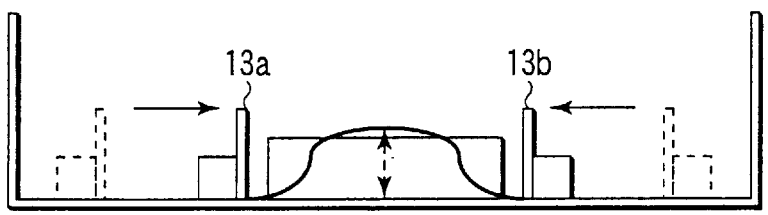
FIG. 8A is a flow chart showing the flow of the main scanning direction sheet size detection process of the digital copying machine as an example of the image forming apparatus according to the first embodiment of the present invention.
Figure 8B:
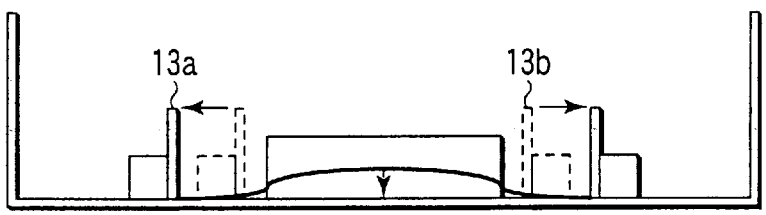
FIG. 8B is a flow chart showing the flow of the main scanning direction sheet size detection process of the digital copying machine as an example of the image forming apparatus according to the first embodiment of the present invention.
Figure 8C:
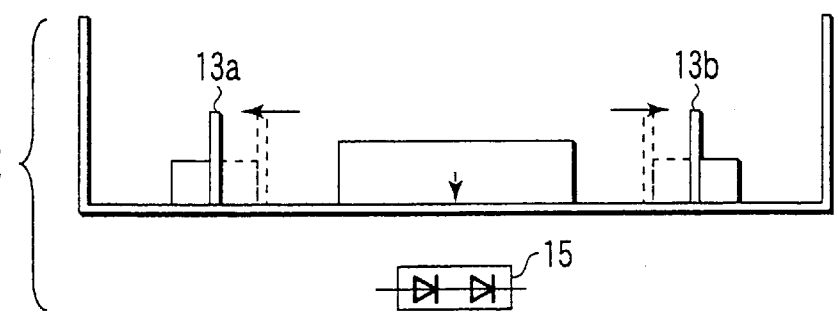
FIG. 8C is a flow chart showing the flow of the main scanning direction sheet size detection process of the digital copying machine as an example of the image forming apparatus according to the first embodiment of the present invention.
Figure 9:
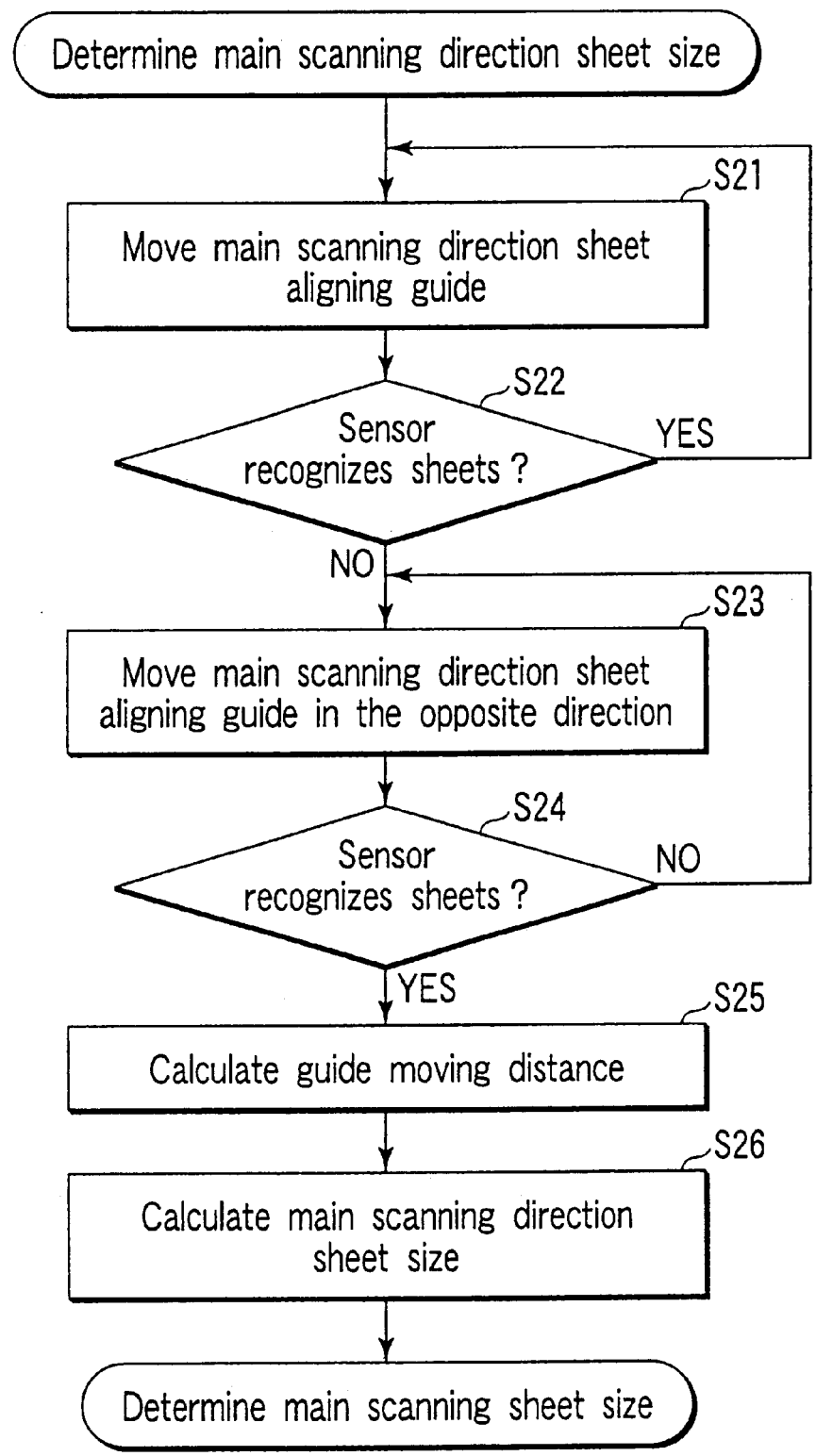
FIG. 9 is a flow chart showing the flow of the main scanning direction sheet size detection process of the digital copying machine as an example of the image forming apparatus according to the first embodiment of the present invention.

The flow of the main scanning direction sheet size detection process will be described below with reference to the drawings of FIG. 8 and the flow chart of FIG. 9.

The sheet guides 13a and 13b are moved at the beginning of the process to decrease the distance therebetween. The sheets held by the sheet guides are bowed to ascend at the central portion (see FIG. 8A). In this time, the sensor 15 cannot detect the presence of the sheets. When the sensor 15 cannot detect the presence of the sheets, the automatic document upsetting section controlling circuit 9 stops the movement of the sheet guides 13a and 13b.

Subsequently, the sheet guides 13a and 13b are moved in the direction in which the sheet width increases, till the sensor 15 can detect the presence of the sheets again (see FIG. 8B). When the sensor 15 detects the presence of the sheets, the automatic document upsetting section controlling circuit 9 stops the movement of the sheet guides 13a and 13b (see FIG. 8C). The distance between the sheet guides at this time is determined as the main scanning width of the sheet (steps S21 to S26).

The feeding direction sheet size detection process of will be performed in the similar manner.

Figure 10:
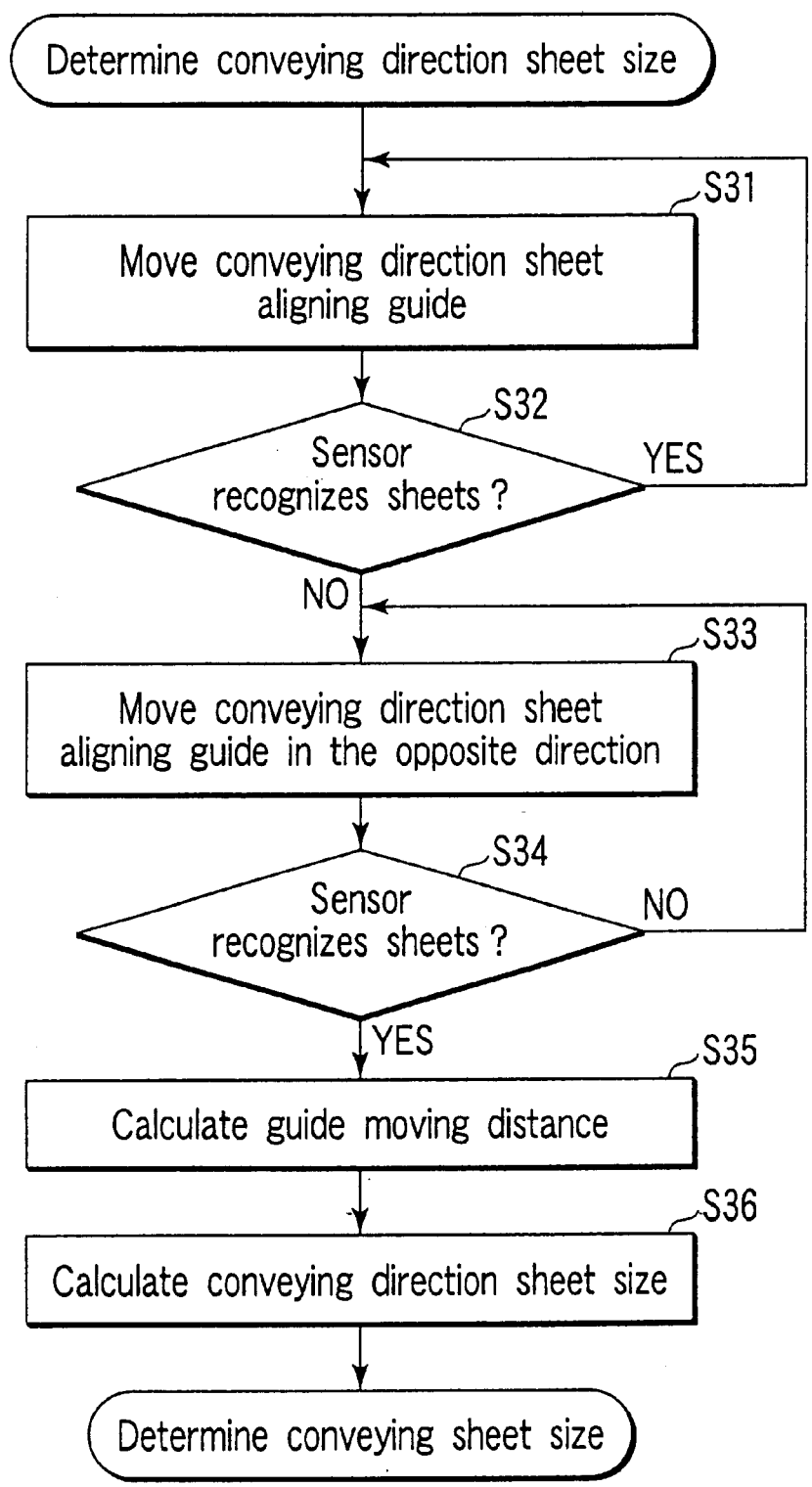
FIG. 10 is a flow chart showing the flow of the sheet feeding direction sheet size detection process of the digital copying machine as an example of the image forming apparatus according to the first embodiment of the present invention.

The flow of the feeding direction (the subscanning direction) sheet size detection process will be described next with reference to the flow chart of in FIG. 10.

The sheet guide 14 is set in advance at the positions such that the size of the sheet is set at the maximum, and moved to decrease the sheet size. When the sheets are bowed to ascend at the central portion and the sensor 15 cannot detect the presence of the sheets, the automatic document upsetting section controlling circuit 9 stops the movement of the sheet guide.

Subsequently, the sheet guide 14 is moved in the opposite direction. When the sensor 15 detects the presence of the sheets again, the movement of the sheet guide 14 is stopped. The position of the sheet guide at this time determines the sheet size in the subscanning direction (steps S31 to S36).

It goes without saying that the feeding direction sheet size detection process may be performed prior to the main scanning direction sheet size detection process.

Next, the relationship between the scanning operation in manual feeding printing and the printing operation according to the first embodiment will be described below in conjunction with FIG. 11 to compare the prior art and the present invention.

Figure 11:
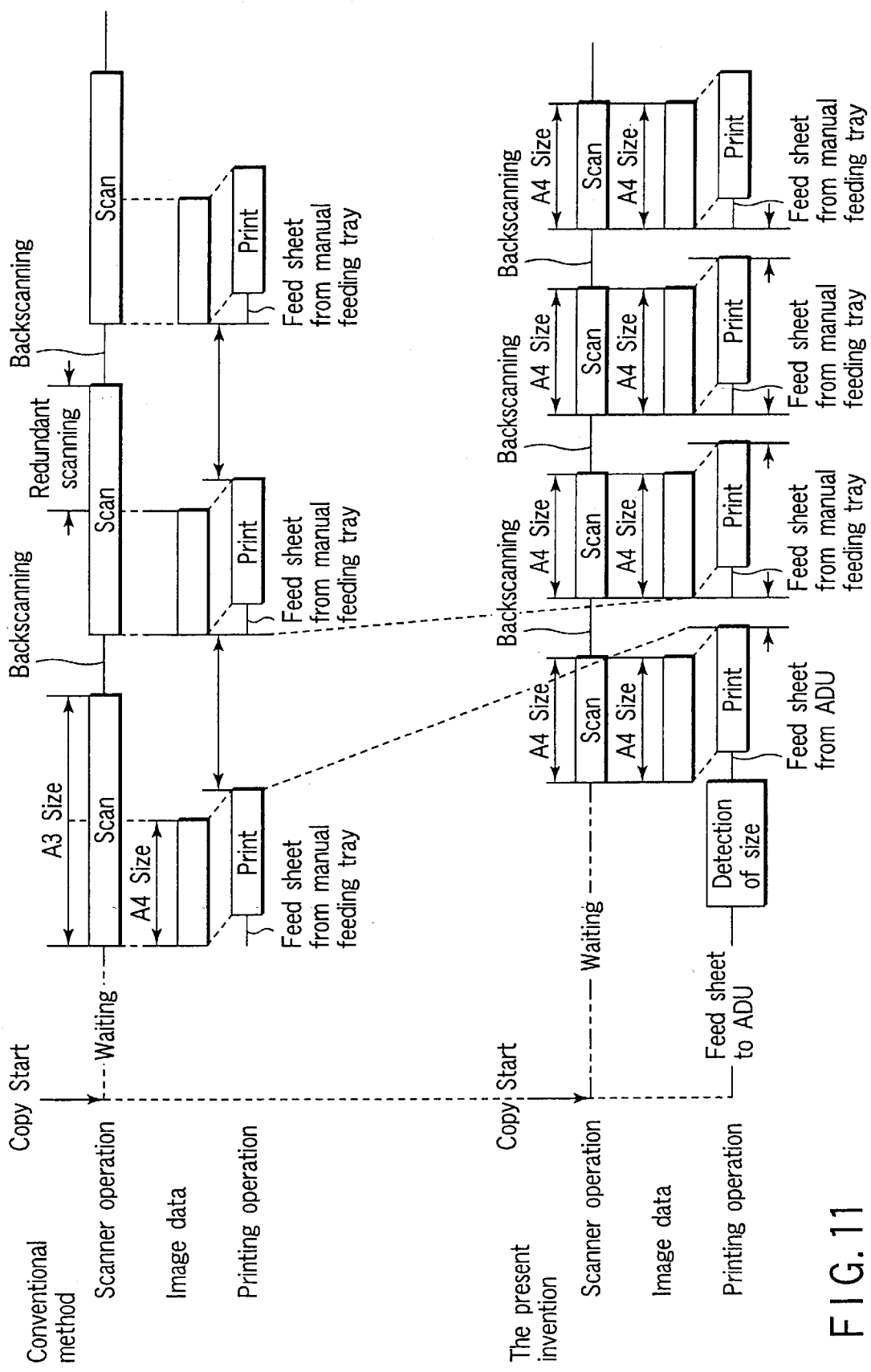
FIG. 11 is an explanatory view showing the relationship between the scanning operation in manual feeding printing and the printing operation to compare the prior art and the present invention.

As shown in the upper half of FIG. 11, according to the prior art, the start button is pushed at first, and then various parameters are set in the apparatus. The scanning operation is then started to attain image data. When the scanning operation is started, the printer engine controlling section 4 controls the sheet feeding controlling section 6 to feed the sheets from the manual feeding tray 8, and starts the printing operation. If the sheet size is A4 in this time, the printer engine controlling section 4 stops the printing operation when the rear end edge of the sheets is detected. The scanner, however, continues the scanning operation till the scanning of the A3 region as the maximum size which can be printed has finished. The scanned data obtained after the printing operation is stopped is rejected. Accordingly, the redundant scanning operation increases the period from the time at which the first printing has finished to the time at which the second printing is started, and decreases the printing speed.

In contrast, with use of the method according to the present invention as shown in the lower half of FIG. 11, the sheet is picked up from the manual feeding tray to be fed to the automatic document upsetting section 16, which is performed simultaneously with the setting of various parameters after pushing the start button. After the automatic document upsetting section 16 detects and determines the sheet size, the scanning operation is started. Simultaneously with the start of the scanning operation, the sheet is fed from the automatic document upsetting section 16 to perform the first printing. In this printing, the sheet size has already been determined, the scanning operation is performed only in the same area as that of the sheet. Accordingly, no redundant scanning operation is performed and thus the second printing operation can be performed without any waiting time. With this process, the printing speed is increased according to the first embodiment of the present invention.

The apparatus according to the prior art described before has a rear end edge detection circuit 218 for detecting the sheet size in the sheet feeding direction during the sheet feeding operation. After detecting the rear end edge of the sheet by this section, the printer engine controlling section 204 performs a processing of stopping the printing by force.

If the image forming apparatus according to the first embodiment of the present invention is provided with the rear end edge detection circuit 218 and the sheet size detection circuit 217 for detecting the sheet size in the main scanning direction in the manual feeding tray 208, the conventional method mentioned above can be also employed.

Similarly, even in the apparatus having the automatic document upsetting section 16, if the main controlling section 1 is constituted such that the software processing can be switched by the user's setting of various parameters on the control panel 2, the conventional method can be also applied. In this case, the sheet size on the manual feeding tray can be also set by operating the control panel 2, and the manual feeding printing operation can be performed to meet more suitably the user's request.

The following is the description of the second embodiment of the present invention.

FIG. 12 shows the structure of a digital copying machine as an example of the image forming apparatus according to the second embodiment of the present invention, wherein the automatic document upsetting section is formed in a stackless type. The difference to the first embodiment will be mainly described below.

As shown in FIG. 12, the second embodiment employs the stackless type of automatic document upsetting section, therefore, the sheet cannot be stored in the automatic document upsetting section. The sheet size detection process according to this embodiment is thus performed in the following manner.

The sheet picked up from the manual feeding tray 8 is sent to the automatic document upsetting section 16, but merely passes through the automatic document upsetting section 16, without being stacked. In this time, the sheet passing time is detected by the sheet detecting sensor 15 in the automatic document upsetting section 16, simultaneously with the detection of the sheet. On the basis of the detected sheet passing time and the feeding speed, the sheet size in the feeding direction is calculated.

Figure 13:
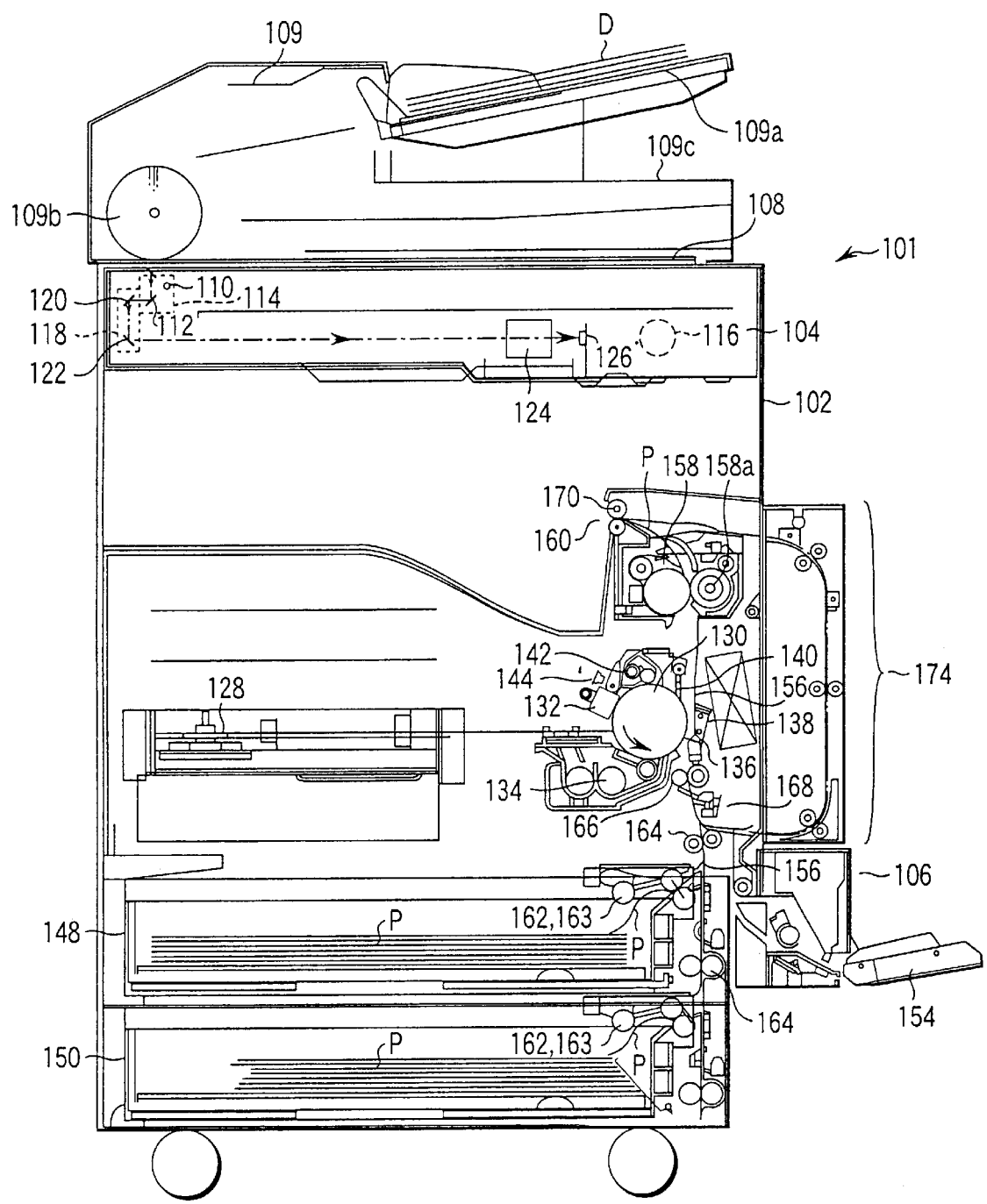
FIG. 13 is a sectional view showing the inner structure of the digital copying machine as an example of the image forming apparatus according to the second embodiment of the present invention.

FIG. 13 shows the inner structure of the digital copying machine 101 as an example of the image forming apparatus according to the second embodiment of the present invention.

As shown in FIG. 13, there is provided on the top of an apparatus body 102 of the digital copying machine 101 a scanner section 104 and a printer section 106.

On the top face of the apparatus body 102, a document mounting table 108. On the document mounting table 108, a document D as an object to be read is mounted. There is also provided on the top face of the apparatus body 102 an ADF 109 for automatically feeding the document onto the document mounting table 108. The document D laid on a document tray 109a of the ADF 109 is conveyed by a conveying guide (not shown), and ejected to an ejection tray 109c by a platen roller 109b. By conveying the document in this manner, the document D is exposed by an exposing lamp 110 of the scanner section 104 described later to read the image on the document D during the period in which the document D is conveyed by the platen roller 109b.

There are stacked on the document tray 109a of the ADF 109 the document D such that the face to be read is laid upward. When a plurality of documents are stacked on the document tray 109a of the ADF 109, the documents are fed one by one from the top of the stacked documents.

The scanner section 104 arranged in the apparatus body 102 has the exposing lamp 110 and a first mirror 112. The exposing lamp 110 is a light source such as a halogen lamp for irradiating the document D conveyed by the ADF 109 or the document D mounted on the document mounting table 108. The first mirror 112 deflect a reflection light reflected from the document D in a predetermined direction. The exposing lamp 110 and a first mirror 112 are attached to a first carriage 114 arranged below the document mounting table 108.

The first carriage 114 is provided so as to move parallel to the document mounting table 108. The first carriage 114 is driven by a scanner motor (the driving motor) 116 via a belt having gears (not shown) so as to reciprocate below the document mounting table 108. The scanner motor 116 comprises a stepping motor or the like. There is arranged below the document mounting table 108 a second carriage 118 capable of moving parallel to the document mounting table 108. The second carriage 118 is provided with second and third mirrors 120 and 122 such that the second and third mirrors 120 and 122 are arranged to be perpendicular to each other.

The second and third mirrors 120 and 122 are provided to deflect the reflection light reflected from the document D and deflected by the first mirror 112.

The second carriage 118 is transmitted with a rotation force of the scanner motor 116 via the geared belt or the like for driving the first carriage 114 and moved thereby in accordance with the movement of the first carriage 114. The second carriage 118 is moved at a half speed of that of the first carriage 114 in parallel to the first carriage 114 along the document mounting table 108.

There are provided below the document mounting table 108 an imaging lens 124 and a CCD sensor 126. The imaging lens 124 is arranged on a plane including an optical axis of the light deflected by the third mirror 122 so as to be moved by a driving mechanism. The imaging lens 124 images the reflection light from the third mirror 120 on the second carriage 118 at a desired magnification (in the main scanning direction) by moving itself.

The CCD 126 photoelectrically converts the incident reflection light focused by the imaging lens 124 in accordance with the image processing clock signal sent from a main CPU described later, and outputs an electric signal corresponding to the read document D.

The magnification in the subscanning direction can be changed by changing the document conveying speed by the ADF 109 or the moving speed of the first carriage 114.

In reading the document D conveyed by the ADF 109, the irradiating position of the exposing lamp 110 is fixed to the position shown in FIG. 13. In contrast, when the document D mounted on the document mounting table 108 is read, the irradiating position of the exposing lamp 110 is moved from left to right along the document mounting table 108.

On the other hand, the printer section 106 has a laser exposing device 128. When the circumferential surface of the photosensitive drum 130 is scanned with the laser light from the laser exposing device 128, an electrostatic latent image is formed on the circumferential surfaces of the photosensitive drum 130.

The printer section 106 has the photosensitive drum 130. The photosensitive drum 130 is arranged rotatably on the right side of the approximately central portion of the apparatus 102 and functions as an image carrier.

The circumferential surface of the photosensitive drum 130 having the above-mentioned structure is exposed by the laser light emitted from the laser exposing device 128 are formed to obtain the desired electrostatic latent image. The photosensitive drum 130 are surrounded by a charging charger 132, a developer 134, a transfer charger 138, peeling crawl 140, a cleaning device 142, and a discharger 144.

The charging charger 132 charges the circumferential surface of the photosensitive drum 130 at a predetermined potential. The developer 134 supplies toner as developer to the electrostatic latent image formed on the circumferential surface of the photosensitive drum 130 in order to develop the image with a desired concentration.

The transfer charger 138 integrally has a peeling charger 136 for peeling the material fed from the sheet feeding cassettes 148 and 150 described later, i.e., copy sheet P off the photosensitive drum 130. The transfer charger 138 transfers the toner image formed on the photosensitive drum 130 to the sheet P. The peeling crawls 140 peels the sheet P off the circumferential surface of the photosensitive drum 130. The cleaning device 142 cleans the toner left on the circumferential surface of the photosensitive drum 130. The dischargers 144 discharges the circumferential surface of the photosensitive drum 130.

The apparatus body 102 has in a lower portion the upper and lower cassettes 148 and 150 drawable from the apparatus and stacked on each other. The cassettes 148 and 150 respectively contain sheets that have a predetermined size. On the side of the upper cassette 148, a manual feeding tray 154 is arranged.

There is provided in the apparatus 102 conveying paths 156 extending from the cassettes 148 and 150 to the photosensitive drum 130 and the transfer chargers 138 through a transfer section. At the ends of the conveying paths 156, a fixing device 158 having a fixing lamp 158a is arranged. There is provided above the fixing device 158 an ejection opening 160.

Each of the upper and lower cassettes 148 and 150 is provided with a sheet feeding roller 162 and a separation roller 163 for picking sheets P from the cassettes one by one. The conveying paths 156 has sheet feeding roller pairs 164. There are provided a plurality of sheet feeding roller pairs 164 for conveying the copy sheets P picked up by the sheet feeding roller 162 and the separation roller 163 through the conveying paths 156.

In the conveying paths 156, there is provided a resist roller pair 166 in the upstream of the photosensitive drum 130. The resist roller pair 166 corrects the leaning of the picked sheet P, and aligns the toner image on the photosensitive drum 130 and the copy sheet P at the front edge. The resist roller pair 166 feeds the copy sheet P at the same speed as the rotation speed of the photosensitive drum 130. In front of the resist roller pair 166, i.e., on the side of the feeding roller pairs 164, an aligning sensor 168 for detecting the arrival of the copy sheet P is arranged.

The copy sheet P picked up from the cassettes 148 and 150 by the sheet feeding roller 162 one by one is sent to the resist roller pair 166 to be aligned, then sent to the transfer section. In the transfer section, the developer image, i.e., the toner image formed on the photosensitive drum 130 is transferred to the sheet P by the transfer charger 138.

The copy sheet P to which the toner images are transferred is peeled off the circumferential surface of the photosensitive drum 130 by the peeling charger 136 and the peeling crawl 140, and sent to the fixing device 158 by a conveying belt (not shown) constituting a part of the conveying path 156. The developer images are melted to be fixed on the copy sheet P by the fixing device 158. After fixing the images, the copy sheet P is sent to the eject tray 172 in the apparatus body 102 through the ejection opening 160 by an ejection roller pair 170.

The apparatus body 102 is provided on the right side of the conveying path 156 with an automatic sheet upsetting device 174 for upsetting the copy sheet P passing through the fixing device 158 and sending it to the conveying path 156 again. There are also provided at the front portion on the top face of the apparatus body 102 with a control panel by which various copying conditions such as a copying magnification are set or instructs the starting of the copying operation.

Figure 14:
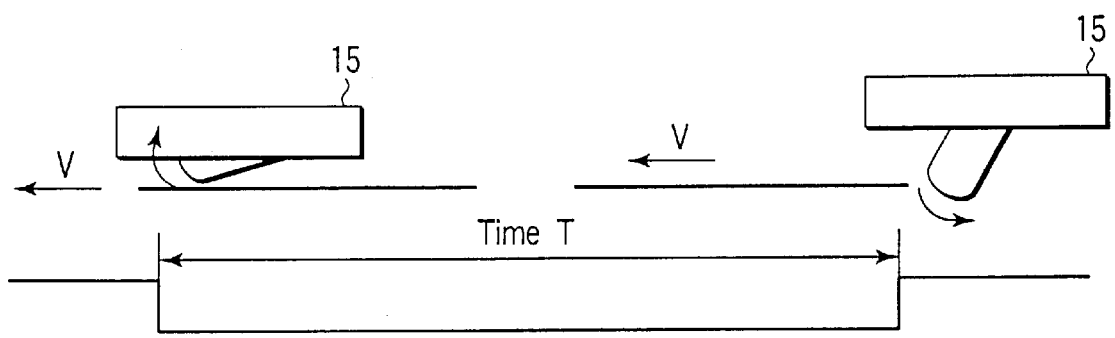
FIG. 14 is an explanatory view showing the sheet size detection process in the automatic document upsetting section of the digital copying machine as an example of the image forming apparatus according to the second embodiment of the present invention.

FIG. 14 shows the sheet conveying path of the digital copying machine using the automatic document upsetting section 18 having no stack, as an example of the image forming apparatus according to the second embodiment of the present invention. The sheet size is obtained when the sheet passes through the automatic document upsetting section 18. For example, when an actuator is employed as the sheet detecting sensor 15, the actuator lever of the sheet detecting sensor 15 is downed to detect the sheet size, and the printer engine controlling section 4 calculates the sheet size L in the conveying direction on the basis of the period T of time during which the lever is downed and the conveying speed V, as shown below.

conveying direction sheet size L=sheet detecting time T/conveying speed V

On the other hand, the sheet size in the main scanning direction is detected in accordance with the conventional manner with use of a sheet size detecting circuit 17 using the guide arranged on the manual feeding tray 8.

In the second embodiment as described above, the sheet size in the conveying direction can be detected simultaneously with the conveying of the sheet without stacking the sheet in the automatic document upsetting section 16, and thus the period of time from the push of the start button to the start of the printing operation can be decreased in comparing with the apparatus using the automatic document upsetting section 16 having a stack.

Although embodiments of the present invention have been described in detail, the following advantages are attained according to the present invention:

According to the present invention, the sheet size in the sheet conveying direction can be determined in advance, and the sheet size is given in performing the printing operation. Since the sheet size is determined prior to the printing operation, and thus various settings or processings can be attained prior to the printing.

The other advantage of the present invention is that the redundant scanning operation exceeding the sheet size does not need to be performed since the sheet size can be specified prior to the printing (scanning) operation. As a result, the interval between the printing operations can be decreased, and thus the printing speed can be increased.

Further, according to the present invention, the user does not need to manually determine the size of the sheet laid on the manual feeding unit, and thus the operation is remarkably simplified.

Still further, according to the present invention, the sheet aligning guide of the ADU is employed to detect the sheet size, thereby the ADU is given the sheet size detection function. Accordingly, the sheet size detection needs not to be performed in the manual feeding unit. With this constitution, the manual feeding unit may have only a sheet holding function, and can be formed in a simple structure, resulting in the decrease of the manufacturing cost.

In addition to the above, the apparatus having no automatic document upsetting section can be used in the similar manner by employing the present invention and the conventional method. Further, if the sheet size in the main scanning direction and that in the subscanning direction are detected separately, i.e., the former is detected is detected by the conventional method and the latter is detected by the method according to the present invention, the time from the pushing of the start button to the start of the actual printing operation can be decreased. Also in the case where the apparatus using the automatic document upsetting section having no stack, the conventional method and the present invention can be employed in conjunction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus for reading an image on a document having a main scanning direction and a sub scanning direction and forming a copy image of the image on a copy image forming medium, comprising:

conveying means for automatically conveying the document;

reading means for reading the image on the document;

image forming means for forming an image on a copy image forming medium;

sheet feeding means having a plurality of sheet feeding cassettes respectively containing corresponding one of sizes of the copy image forming medium, and a manual feeding tray for manually stacking a desired size of the copy image forming medium, the sheet feeding means feeding sheets selectively from one of the manual feeding tray and the sheet feeding cassettes;

automatic document upsetting means for two-dimensionally detecting a size of a first one of the copy image forming medium fed from the manual feeding tray when the sheet feeding means selects the manual feeding tray to feed the copy image forming medium therefrom; and controlling means for controlling the reading means to read the image in accordance with the detected size of the copy image forming medium, and controlling the image forming means for forming the copy image on the copy image forming medium.

2. The image forming apparatus according to claim 1, wherein the automatic document upsetting means has a copy image forming medium aligning guide movable in two directions and a copy image forming medium detecting section, and two-dimensionally detects a size of a first one of the copy image forming medium fed from the manual feeding tray in accordance with a moving distance of the copy image forming medium aligning guide and an output signal of the copy image forming medium detecting section.

3. The image forming apparatus according to claim 2, wherein the copy image forming medium detecting section is an optical sensor arranged on a part of a plane of the automatic document upsetting means in order to optically detect one of a presence and an absence of the copy image forming medium.

4. The image forming apparatus according to claim 1, wherein, when the image forming means forms the copy image on a plurality of copy image forming mediums, the controlling means controls the image forming means to form a first image by feeding one of the copy image forming mediums from the automatic document upsetting means, and controls the image forming means to form a second image by feeding one of the copy image forming mediums from the manual feeding tray.

5. The image forming apparatus according to claim 1, further comprising operation inputting means for inputting instruction from outside of the apparatus, the operation inputting means for inputting the size of copy image forming mediums in advance.

6. The image forming apparatus according to claim 1, further comprising indicating means for indicating a predetermined alarm when the copy image forming medium size two-dimensionally detected by the automatic document upsetting means exceeds an area within which image forming operation can be performed by the image forming means.

7. The image forming apparatus according to claim 1, wherein the automatic document upsetting means further comprises a mechanical sensor constituted to drive in accordance with movement of the copy image forming medium.

8. An image forming apparatus for reading an image on a document having a main scanning direction and a sub scanning direction and forming a copy image of the image on a copy image forming medium, comprising:

a document conveying section which automatically conveys the document;

a reading section which reads the image on the document;

an image forming section which forms an image on a copy image forming medium;

a sheet feeding section having a plurality of sheet feeding cassettes respectively containing corresponding one of sizes of copy image forming mediums, and a manual feeding tray for manually stacking a desired size of the copy image forming mediums, the sheet feeding section feeds sheets selectively from one of the manual feeding tray and the sheet feeding cassettes;

an automatic document upsetting section having a copy image forming medium aligning guide movable in two directions and an optical sensor which optically detects one of a presence and an absence of the copy image forming medium, the automatic document upsetting section two-dimensionally detects a size of a first one of the copy image forming mediums fed from the manual feeding tray in accordance with a moving distance of the copy image forming medium aligning guide and an output signal of the sensor; and a controlling section which controls the reading section to read the image in accordance with the detected size of the copy image forming mediums, and controlling the image forming section which forms the copy image on the copy image forming mediums, and, when the image forming section forms the copy image on a plurality of the copy image forming mediums, the controlling section controls the image forming section to form a first image by feeding one of the copy image forming mediums from the automatic document upsetting section, and controls the image forming section to form a second image by feeding one of the copy image forming mediums from the manual feeding tray.

9. An image forming apparatus for reading an image on a document having a main scanning direction and a sub scanning direction and forming a copy image of the image on a copy image forming medium, comprising:

a document conveying section which automatically conveys the document;

a reading section which reads the image on the document;

an image forming section which forms an image on a copy image forming medium;

a sheet feeding section having a plurality of sheet feeding cassettes respectively containing corresponding one of sizes of copy image forming mediums, and a manual feeding tray for manually stacking a desired size of the copy image forming mediums, the sheet feeding section feeds sheets selectively from one of the manual feeding tray and the sheet feeding cassettes;

an automatic document upsetting section having a mechanical sensor for mechanically detecting one of a presence and an absence of the copy image forming medium, the automatic document upsetting section two-dimensionally detecting a size of a first one of the copy image forming mediums fed from the manual feeding tray in accordance with an output signal of the sensor; and a controlling section which controls the reading section to read the image in accordance with the detected size of the copy image forming mediums, and controls the image forming section for forming the copy image on the copy image forming mediums, and, when the image forming section forms the copy image on a plurality of the copy image forming mediums, the controlling section controls the image forming section to form a first image by feeding one of the copy image forming mediums from the automatic document upsetting section, and controls the image forming section to form a second image by feeding one of the copy image forming mediums from the manual feeding tray.

* * * * *